United States Patent
DiPietro et al.

[15] 3,650,820
[45] Mar. 21, 1972

[54] PRODUCTION OF FLAME RETARDANT CELLULOSIC MATERIALS

[72] Inventors: Joseph DiPietro, Alma; John Heaton Todd, St. Louis; Robert John Mulph, Alma, all of Mich.

[73] Assignee: Michigan Chemical Corporation, St. Louis, Mich.

[22] Filed: Feb. 17, 1969

[21] Appl. No.: 800,831

[52] U.S. Cl. .................. 117/136, 106/15 FP, 117/140 R, 117/143 R, 117/154, 252/8.1
[51] Int. Cl. ............... C09k 3/28, D06m 13/26, C09d 5/18
[58] Field of Search ............. 117/136, 143, 154, 140 R; 252/8.1; 106/15 FP; 260/DIG. 24

[56] References Cited

UNITED STATES PATENTS 3,468,678  9/1969  Clampitt et al. ................. 106/15

*Primary Examiner*—William D. Martin
*Assistant Examiner*—Harry J. Gwinnell
*Attorney*—D. Cameron Pond and Shanley and O'Neil

[57] ABSTRACT

Various cellulosic materials such as cotton, burlap, jute, fiberboard and paper may be rendered flame retardant without impairing desirable physical properties by treating them with an aqueous solution of a water soluble salt of a polyhaloalkyl acid ester of phosphoric acid in which the halogen is bromine or chlorine and in which the alkyl radical contains two through six carbon atoms. An acid may be used if it is water soluble.

11 Claims, No Drawings

PRODUCTION OF FLAME RETARDANT CELLULOSIC MATERIALS

The present invention relates to an improved method for treating cellulosic materials to render them flame retardant or self-extinguishing, and to the materials produced thereby.

The importance of imparting flame retardant characteristics to various cellulosic materials such as cotton, burlap, jute, fiberboard, paper, and straw has long been recognized since such materials are very flammable indeed, unless they are specially treated. And materials of construction, textiles and other products produced from or containing such cellulosic materials are also very flammable as a rule, since many of these materials not only contain cellulosic materials but often flammable materials as well, such as waxes, finishes, dyes, coatings and the like. Thus the finished product is, if anything, more flammable than the cellulosic material which was used in its production.

Usually it is not practicable and sometimes it is not possible to make these flammable materials completely fire resistant or self-extinguishing. However, it is desirable to provide such materials with sufficient fire retardant properties to delay appreciably the propagation of the flame. It is also most desirable to prevent "afterglow;" that is, to prevent the material from continuing to smolder or burn at a very slow rate after the flame itself is extinguished. If afterglow occurs, the flame could break out again, or the material could be consumed or partially consumed because of the afterglow.

In treating these cellulosic materials to render them fire retardant, it is especially important that the treating method or additives do not impair the desirable physical properties of the treated material, such as, its strength, hand, flexibility, resistance to abrasion, color and the like. Also, any fire retardant additives or treating procedure should produce a uniform result so that the material treated does not have its properties adversely effected in spots or localized areas and, of course, the fire retardant characteristics should be uniform. The procedure or method for treating the material must be simple and easy to utilize with conventional equipment, inasmuch as the treated materials are almost always ordinary products of commerce, so that practical and inexpensive procedures are indicated.

The fire retardant additives and procedures commonly employed heretofore have been defective in one way or another and have not met these requirements, although some of them have been effective for a particular material, or under some special set of conditions. For instance, various flameproofing compositions have been proposed for treating paper or generally similar nonwoven cellulosic materials to provide added strength, or at least to avoid loss of strength, while permitting the material to be subjected to bending without rupturing the fibers. But these procedures have either been pretty ineffective for flame proofing purposes while avoiding these difficulties or they have not avoided the difficulties. For example, an impregnating solution containing tetrakis (hydroxymethyl) phosphonium chloride and a vinyl chloride-vinylidene chloride copolymer latex has been one of the more commonly used procedures heretofore — see U.S. Pat. No. 3,243,391. But this method requires the use of an organic solvent or vehicle such as isopropanol. It is expensive and difficult to use, and has adversely affected some of the properties of the cellulosic material especially its flexiblity.

A really effective method for treating cotton would impart to the treated material the ability to resist flame and afterglow without impairing the inherent properties of cotton making it so satisfactory as a textile or upholstery material especially its breaking strength, tearing strength, elongation, abrasion resistance and hand. One of the more successful treatments involves the application of a partially polymerized brominated triallyl phosphate to a cotton fabric, — see British Pat. No. 688,372. However, this process is of limited practicability because of its high cost, the number and difficulty of the treating steps involved, and the hazards and difficulties inherent in the organic solvent necessary in the application. It also produces a stiff material. Efforts to overcome some of these difficulties through the use of a polyhaloalkyl acid ester of phosphoric acid plus formaldehyde and melamine or urea has resulted in applying a reaction product of these materials: that is, a resinous coating. Good fire retardant characteristics were provided but the process is obviously difficult to utilize and is very expensive. This process in particular results in a stiff fabric and one that is brittle, that is, the cellulosic fibers themselves apparently no longer possess their normal flexiblity, — see U.S. Pat. No. 2,711,998.

Other and perhaps better known methods have been used for flame treating some cellulosic materials, especially paper and paper products. For example, some water soluble inorganic salts such as ammonium sulfate and ammonium phosphate are effective as flame retardants for paper and possess the further advantage of relative ease of processing at a very low cost. Unfortunately their effectiveness is appreciably reduced or destroyed altogether upon even a slight wetness of the paper. Another problem has been the difficulty experienced in incorporating these water soluble inorganic salts into a rosin sized paper while retaining both satisfactory flame proofing properties and the desirable water resistance normally imparted by the size. Also, these salts have not been effective or desirable in the treatment of many other cellulosic materials such as cotton fabric.

In short, flameproofing cellulosic materials involves many different kinds of materials as well as many different products containing them and both are commonly used under a wide variety of conditions. A single method or procedure for rendering all of them fire retardant and which at the same time overcomes all of the difficulties involved would be ideal; but does not seem possible as a practical matter. However, it is highly desirable to provide a method which is inexpensive and easy to utilize and which is effective for most of the materials and which is effective under ordinary conditions of their use, despite the fact that such "ordinary" conditions are very diverse.

The present invention provides such a method. Cellulosic materials of many kinds may be rendered flame retardant and in some cases, self-extinguishing under most conditions of use without impairing their desirable physical properties by impregnating or otherwise treating them with an aqueous solution containing a water soluble salt of a polyhaloalkyl acid ester of phosphoric acid in which the halogen is bromine or chlorine and in which the alkyl radical contains two through six carbon atoms. The alkyl radical may be straight chained or branch chained. It should be particularly noted that the solution is an aqueous solution, thus avoiding the difficulty and hazards inherent in utilizing an alcohol or some other organic solvent. The composition may be applied easily in any appropriate and convenient manner, and the applying procedure is simple. For example, spraying, dipping or padding procedures may be utilized. Also, suitable rollers may be used if desired, depending upon the particular material treated and the equipment available. And the procedure is inexpensive as compared with most flame retarding means.

More particularly, in carrying out the present invention the use of an aqueous solution of the ammonium salt of bis (2,3-dibromopropyl) phosphate is recommended.

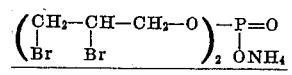

Instead of this compound, the ammonium or di ammonium salt of the mono acid may be used,

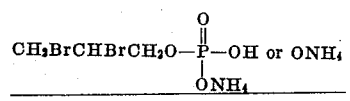

or the ammonium salt of the isopropyl analogue may be used; that is, bis (1,3-dibromoisopropyl) phosphate.

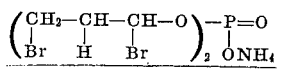

The ammonium salt of the mono acid corresponding to this isopropyl analogue may be used also. And chlorine may be substituted for one or more of the bromines in any of the compounds mentioned above in one of their alkyl chains or in both of them in the case of the bis compounds. In fact, the alkyl chain or chains may contain from two through six carbon atoms, either straight or branch chained with two bromines substituted in each chain, or two chlorines so substituted, or one bromine and one chlorine.

It is, of course, necessary for present purposes that these fire retardant compounds be water soluble. The tris compounds corresponding to the mono and bis compound mentioned above are not water soluble and neither are the bis acids themselves. At least these compounds are not sufficiently soluble to be practical. Thus, water soluble salts of these compounds should used. But the ammonium salts, although particularly recommended, are not the only ones which could be employed. Any suitable water soluble salt of these acids could be used. For example, those formed from sodium, magnesium and various amines especially the so called simple amines, such as pyridine and butylamine could be employed. The corresponding salts of the mono acids could also be employed, if desired, although the mono acids, since they contain the polarizing

group are sufficiently water soluble to be used as the acid itself.

The following examples are presented by way of further illustration of the invention, but should not be construed as limiting. All parts and percentages, including those in the examples, are by weight unless otherwise indicated.

EXAMPLE I

Into an aqueous solution of ammonium bis (2,3-dibromopropyl) phosphate, specific gravity 1.15 and containing 23.5 percent by weight of dissolved solids, was immersed by a 6 × 12 inch piece of burlap, weight 11.8 g. Burlap is a loose woven material made from jute or hemp fibers. These specimen weighed approximately 7.5 ounces per square yard. After a few seconds immersion, the material was fed between rollers and excess liquid was removed. After drying in an oven for 1 hour at 65° C., the piece weighed 14.8 g. (an add-on of 25.5 percent on the dry basis). Strips 1 × 12 inches were cut and several suspended vertically. No ignition occurred when a specimen was contacted with the flame of a common wooden match. (Fire Resistance-Match Method No. 30–27, Material Testing Laboratory, Fisher Body Division, General Motors Corp., Engineering Section). This test is described in detailed hereinafter.

It is not necessary to use the pure ammonium salt of bis (2,3-dibromopropyl) phosphate. Relatively crude material may be used such as that referred to in Example II below. It is recommended however, that the aqueous solution of the additive be adjusted so as to produce a specific gravity of about 1.15 and a solids content of very nearly 23 percent. This solution when used with this burlap will produce a dry add-on of at least 25 percent. It was found that on an as received basis, the crude material may have a specific gravity as high as about 1.22, and a solids content as high as about 37 percent. Of course, a set of conditions differing from those recommended above can be used, but a standard set of conditions suitable for the particular material treated is necessary in order to obtain consistent results. And for this burlap, it is recommended that the add-on (on the dry basis) be at least 25 percent if the material is to be rendered self-extinguishing according to the Match Method 30–27 referred to above.

EXAMPLE II

Waste cotton used in the manufacture of cotton batting for cushioning material was immersed in an aqueous solution of the ammonia wash from the neutralization of crude tris (2,3-dibromopropyl) phosphate (manufactured by the reaction of 2,3-dibromopropanol and phosphorus oxychloride. This ammonia wash contained approximately 30 percent solids and is essentially a solution of the ammonium salt of bis (2,3-dibromopropyl) phosphoric acid containing small amounts of mono-2,3-dibromopropyl phosphoric acid, tris (2,3-dibromopropyl) phosphate and a small amount of ammonium chloride. The wet cotton was filtered under vacuum and pressed until liquid no longer drained from it. After drying in a force draft at 70° C. until constant in weight, it was determined that a 90 percent add-on of solids on the cotton had occurred (on the dry basis). This treated material was blended with untreated waste cotton on a garneting machine and a pad approximately one-fourth inch in thickness was obtained. The ratio of treated to untreated cotton was about 1 to 9. No ignition occurred when these specimen were contacted with the flame of a wooden match according to the Match Method 30–27 referred to in Example I above and described hereinafter. It was also found that specimen of the blended material 2 inch by 14 inch were self-extinguishing when ignited in a vertical position for 10 seconds with a Bunsen burner equipped with a wing tip and adjusted so as to provide a blue flame 1½ inch in height and placed so that the outer edge of the flame extended into the front edge of the specimen. This test is similar to ASTM Test Method D1692; but differs therefrom in that the specimen is in a vertical position instead of being supported in a horizontal position.

EXAMPLE III

Cotton fabric of the type usually utilized as backing for polyvinyl polymers was cut into pieces approximately 12 inches square. This particular fabric weighed about 9 ounces per square yard and this specimen weighed 27.6 grams. The specimen was immersed in an aqueous solution of the ammonium salt of bis (2,3-dibromopropyl) phosphate so adjusted as to contain about 25 percent solids. The material described above in connection with Example II was utilized. The specimen was so immersed for about 10 seconds and after its removal was wrung to remove excess fluid. The wet weight was 83.4 grams so that the wet add-on was 55.5 grams. The specimen was then dried in an oven for 1 hour at 130° C. The dry weight was 40.8 grams so that the dry add-on was 13.7 grams; that is, 50.5 percent.

A second specimen of similar cotton fabric but lighter in weight was also immersed in the solution mentioned above and treated according to the same procedure. A 12 inch square specimen weighed about 15.7 grams. The wet add-on was 42.2 grams and the dry add-on 5.9 grams; that is, 37.6 percent.

A third specimen of a similar fabric was also treated according to this procedure. A 12 inch square of this material weighed about 10.5 grams. The wet add-on was 30.5 grams, and the dry add-on 4.7 grams; that is, 44.8 percent.

All three of these specimen were subjected to the AATCC test which is explained hereinafter. The char varied in length from 2 to 3 inches so that all of the specimen were considered to be self-extinguishing by this test.

It will be noted that, although the specimen mentioned in this Example III varied in weight, the results were not consistent insofar as the absorption of the treating solution is concerned. For some materials, it has been found necessary to adjust the solution to fit the case. However, for cotton fabric of this general character, it is recommended that the solution contain at least 20 percent solids so as to produce an add-on on the dry basis of at least 25 percent. It is believed that cotton fabric so treated will be self-extinguishing according to the AATCC test. It will be noted that some of the specimen mentioned above resulted in a greater add-on and such increased add-on may well have been unnecessary in this instance. However, the add-on desired is determined to a certain extent by the judgement of the experimenter or utilizer. And for some purposes, it might be desirable to provide the increased add-on.

EXAMPLE IV

A series of runs was made using a nonwoven cellulosic material produced by the usual chemical and mechanical means from pulp. Suitable pulp for this purpose could be made from wood, rags, straw, or bagasse or mixtures thereof. The particular material referred to in this Example was light in weight, about 9 grams per square yard, and is commonly known as tissue paper. The specimen (4 × 12 × 1 inch strips) were dipped into an aqueous solution of the ammonium salt of bis(2,3-dibromopropyl) phosphate, the strength of the solution and the dry add-on being varied for each group treated. Since much of this data would be repetitious for present purposes, several specimen have been selected including at least one from each group and the data concerning them is presented below in Table I. "Resin" in Table I refers to the pretreatment of the material (or lack of it) with a resin — resin "A" or resin "B." Resin A is the usual wood rosin commonly used for materials of this type. Resin B is a resinous material used to impart improved physical properties to the material.

TABLE I

| Specimen | Solution % Dissolved Solids | Dry Add-On | Resin | Char Length in inches; AATCC Test |
| --- | --- | --- | --- | --- |
| I-B | 20% | 21.4 | None | 4¾ |
| I-F | 40% | 43.5 | None | 3¼ |
| I-I | 60% | 58.0 | None | 3¼ |
| II-C | 38.7% | 38.7 | 35% A | 3½ |
| III-C | 34.8% | 34.8 | 55% A | 3¾ |
| IV-C | 37.7% | 37.7 | 35% B | 3¾ |
| V-C | 41.5% | 41.5 | 49% B | 2¾ |

EXAMPLE V

A 3 × 12 inch piece of matted jute was cut from a much larger piece. Felted or matted jute is unwoven material used as an underlayment for floor covering material such as automobile floor mats and the like. This material was pre-dried for 1 hour at 110° C. and weighed 48.3 grams after this pre-drying step. The specimen was then sprayed on one surface with an aqueous solution of the ammonium salt of bis (2,3-dibromopropyl) phosphate similar to the solutions discussed in the preceding Examples, except that this solution had been adjusted to provide a 20 percent solids content. This spraying operation was conducted so as to provide a wet weight of 72.8 grams; that is, a wet add-on of 24.5 grams. The specimen was then dried for 1 hour in an oven at 83° C. which resulted in a dry add-on of 8.6 grams. The other side was then sprayed with the same solution and utilizing the same procedure; but the dry add-on for the other side in this instance was 3.8 grams. Thus, the total dry add-on was 12.4 grams; that is, 25.6 percent. The treated specimen was then cut into 1 × 12 inch strips and was tested for its fire retardant properties by means of the Fire Resistance Match Method 30–27 referred to in Example I above. These strips proved to be nonburning according to this test and no afterglow or smoldering resulted. After-glow is quite common for this type of material.

It will be noted that in this instance the flame retardant additive of the present invention was added by a spraying operation. Felted jute, if immersed in an aqueous solution will absorb so much solution that there is too much add-on, and the drying operation is so difficult that a vacuum drying technique is usually required. This has resulted in seriously altering the physical properties of the jute making it brittle and stiff. It is believed that the fire retardant additive would operate satisfactorily with a dipping or padding technique if one could be worked out so as to add the proper amounts of additive conveniently. Nevertheless, the spraying technique referred to above is recommended in this particular instance.

EXAMPLE VI

Two specimen 6 by 12 inches of cotton duck (canvas) about 10 ounces per square yard were submerged for 30 seconds in an aqueous solution of the ammonium salt of bis (2,3-dibromopropyl) phosphate. The solution used for this particular treatment had a specific gravity of 1.17 and a solids content of about 25 percent. After immersion, the specimen were fed between rollers in order to remove excess solution and were dried for 2 hours at 82° C. in an oven. The dry add-on was determined as 16.5 and 16.9 percent for the respective specimen. Each specimen was then cut into three 2 × 12 inch strips and evaluated for flame retardancy by the "Fire Resistance Match Method 30–27," Material Testing Laboratory, Fisher Body Division, General Motors Corporation, Engineering Section. By this test the treated cotton canvas was non-burning and showed no afterglow.

It should be mentioned, however, that although this material passed this test, it did char. It is also believed that in order to be considered nonburning according to the AATCC Test that a greater add-on would be needed, and in that event, an add-on of about 20–25 percent is recommended. Burn tests such as those under consideration herein are rather empirical, and much depends upon the material tested, the purpose to which it is put, and the judgement of the investigator or the utilizer of the material.

The procedure of the foregoing examples may be practiced by utilizing fire retardant additives other than ammonium bis (2,3-dibromopropyl) phosphate. As noted hereinbefore, a polyhaloalkyl acid ester of phosphoric acid may be employed if it is water soluble or a water soluble salt may be used. The halogen is bromine, chlorine or mixed bromine chlorine.

Such other fire retardant additives include the ammonium salt of bis (1-bromo-3-chloroisopropyl) phosphoric acid, bis (2-bromoethyl) phosphoric acid, bis (1,3-dibromoisopropyl) phosphoric acid, a mixture of bis (2,3-dibromopropyl) phosphoric acid and bis (1-bromo-3-chloroisopropyl) phosphoric acid, a mixture of bis(2,3-dibromopropyl) phosphoric acid and bis(2-bromoethyl) phosphoric acid, a mixture of bis(1,3-dibromoisopropyl) phosphoric acid and bis (2,3-dibromopropyl) phosphoric acid, a mixture of bis(1,3-dibromoisopropyl) phosphoric and bis (2-bromoethyl) phosphoric acid, a mixture of bis(1-bromo-3-chloroisopropyl) phosphate and bis(2-bromoethyl) phosphoric acid, a mixture of bis(2,3-dibromopropyl) phosphoric acid and the mono(2,3-dibromopropyl) phosphoric acid, a mixture of bis(1-bromo-3-chloroisopropyl) phosphoric acid and 1-bromo-3-chloroisopropyl phosphoric acid, a mixture of bis(1,3dibromoisopropyl) phosphoric acid and 1,3-dibromoisopropyl phosphoric acid, and a mixture of bis(2-bromoethyl) phosphoric acid and 2-bromoethyl phosphoric acid.

Instead of the ammonium salt of bis(2,3-dibromopropyl) phosphate, other water soluble salts may be used in place of the fire retardant additives recommended. These include the sodium, magnesium and antimony salts, although the ammonium salt is, for most purposes, the practical one.

As noted in Example VI, test methods for evaluating the fire retarding characteristics of cellulosic materials are rather empirical. Tests tend to be devised for particular materials or uses, and data obtained from one test are especially difficult to correlate with that from another. And what is "fire-retardant" as contrasted with "non-burning" or "self-extinguishing" according to one test may not be so according to another, or a given test may be altogether unsuitable for some particular material. The "Fire-Resistance Method No. 30–27," and the AATCC tests relied upon to a large extent for present purposes are believed to be appropriate for the cellulosic materials treated. Other tests might be used, of course, although some of them are more suitable for other materials. For example ASTM test 1692-59T referred to above is intended primarily for plastics or plastic coated materials.

Fire-Resistance Match Method No. 30–27, Material Testing Laboratory, Fisher Body Division, General Motors Corporation, Engineering Section involves the following procedure. A specimen of the material, 1 × 12 inch, is cut. A gage mark is made in the middle of the 12 inch length for each specimen and the specimen is suspended vertically lengthwise from a clamp. A wooden match is lit and used to ignite the bottom of the 1 inch edge of the specimen. The specimen is exposed to the flame of the match until the match is consumed (about 15 seconds). If the flame is extinguished within 5 seconds after the match is consumed and the specimen is not burned past the center gage mark, the fabric is considered to be self-extinguishing. If any of the specimen are burned beyond the center gage mark, or if they produce afterglow for more than one minute after the fabric flame has gone out, the specimen may be considered as fire retardant; but not as self-extinguishing. By comparing each specimen with the others or with a control, one can obtain a measure of the fire retardation of various treated fabrics as compared to each other, or as compared to untreated material.

In order to obtain results which can be duplicated or to obtain meaningful results if comparative data is sought, it is often necessary to precondition the specimen prior to the actual test procedure mentioned above. There are various accepted ways of preconditioning. Usually they involve preheating the specimen for a specified time and sometimes at a specified relative humidity. One accepted method of preconditioning is described in ASTM test 1692-59T, ASTM Standards 1967, Part 27, pages 556-559, published by the American Society for Testing and Materials, 1916 Race Street, Philadelphia, Penn.

The AATCC test referred to hereinbefore is intended in particular for use with industrial fabrics and was devised by the American Association of Textile Chemists and Colorists. According to this test, a specimen is mounted on a frame in a test chamber and is subjected to a standard flame under controlled conditions. The specimen is then evaluated for afterflaming, afterglow and range of char. A cabinet is provided and the sample holder is arranged to securely hold the fabric along its two vertical edges. The specimen is held in a vertical position with respect to a Bunsen burner so that its lower edge will extend three-fourths of an inch into the flame when the burner is ignited. The test is conducted after the sliding panel of the cabinet is closed by subjecting the specimen to the flame of the Bunsen burner for 12 seconds. The burner is then extinguished. The fabric may be considered fire retardant if afterflaming does not exceed 2 seconds, and the charring does not exceed certain specified limits. These limits differ with the weight per square yard of the fabric tested. AATCC Standard Test Method 34-1966, Technical Manual (1966) of the American Association of Textile Chemists and Colorists, B 135 and 136, published for the Association by Howes Publishing Company, Inc., 44 E. 23rd Street, New York, New York.

Other tests which might be used in connection with the present invention, if desired, include the Ellipse Flammability test and the Federal Aviation Agency test. The former is used particularly for fabrics used in clothing and the latter particularly for materials utilized by the aircraft industry. According to the Ellipse Flammability test, the shape of the specimen is a quarter ellipse, the major axis of which is 3.5 inches and the minor axis 2 inches. The specimen is clamped with the major axis in a vertical position. The ignition is on the vertical edge five-eighth inches below the top. The specimen's shape is said to be such that the curved edge will not burn for self-extinguishing fabrics, and that the length of the edge which is burned is a measure of flame retardation (see American Dyestuff Reporter, Vol. 53, No. 19, pg. 23-26). The Federal Aviation Agency test, involves a specimen 2½ inches in width and 12 inches in length. The specimen is clamped in a horizontal frame with the coated side up (for coated materials). One and one-half inches is allowed to drop vertically into a Bunsen burner flame which is 3 inches high with a 1 ½inch blue cone, and is kept there for 15 seconds. The flame is removed and the burn rate is measured. If the flame goes out during the first minute after removal of the Bunsen burner and the specimen does not burn more than 4 inches, the fabric is considered self-extinguishing.

What is claimed is:

1. A method for rendering a natural cellulosic material flame-retardant which comprises treating said material with a solution consisting essentially of an aqueous medium containing as the flame-retarding agent a water soluble polyhalo alkyl mono- or bis- acid ester of phosphoric acid, a water soluble salt of said acid, or mixtures thereof, wherein the alkyl radical contains two to six carbon atoms and the halogen is either bromine or chlorine or both, and thereafter drying the cellulosic material so treated, said water soluble flame-retarding agent being characterized in that it is retained by the cellulosic material after said treating and drying steps.

2. A method according to claim 1 wherein the content of the water soluble flame-retarding agent in the solution, and the time of treating said cellulosic material are such that the dry add-on to the material is at least 25percent.

3. A method according to claim 1 wherein the natural cellulosic material is cotton, burlap, jute, fiberboard or paper.

4. A method according to claim 1 wherein the water soluble flame-retarding agent is a salt of bis (2,3-dibromopropyl) phosphate.

5. A method of rendering flame retardant a natural cellulosic material derived from cotton, jute, hemp or cellulosic pulp which comprises immersing said cellulosic material in an aqueous solution of a flame retarding agent consisting essentially of a water soluble salt of bis(2,3-dibromopropyl) phosphate.

6. A method according to claim 5 wherein the water soluble salt is the ammonium salt.

7. A method according to claim 5 wherein the content of the dissolved solids comprising the salts of bis(2,3-dibromopropyl) phosphate is at least 20 percent by weight of said aqueous solution and the immersion time and process conditions are so determined as to provide a dry add-on of at least 25percent.

8. A process for rendering burlap material flame retardant which comprises impregnating said burlap material with an aqueous solution of ammonium bis(2,3-dibromopropyl) phosphate, said solution containing at least 20 percent by weight of said ammonium salt, removing excess solution therefrom, and thereafter drying said material to thereby produce a flame retardant burlap material having a dry add-on of at least 25 percent by weight.

9. A process for rendering flame retardant a cotton fabric which comprises the steps of immersing said fabric in an aqueous solution of the ammonium salt of bis(2,3-dibromopropyl) phosphate, said solution containing at least 20 percent by weight of said dissolved ammonium salt, removing excess solution therefrom, and thereafter drying the material to thereby produce a dry add-on of at least 25 percent by weight.

10. A process for rendering flame retardant a nonwoven cellulosic material derived from a cellulosic pulp, which comprises immersing the material in an aqueous solution of the ammonium salt of bis(2,3-dibromopropyl) phosphate, said solution containing at least 20 percent by weight of the dissolved ammonium salt, removing the excess solution therefrom, and thereafter drying the material, thereby producing a dry add-on of at least 25 percent by weight.

11. A process for rendering flame retardant a felted jute sheet material having two major face surfaces which comprises the steps of:

a. removing the moisture from said material;

b. spraying one major surface with an aqueous solution of the ammonium salt of bis(2,3-dibromopropyl) phosphate;

said solution containing about 20 percent by weight of the dissolved ammonium salt;
c. drying said sprayed surface;
d. spraying the second major surface with the aqueous solution of step (b);
e. drying the second sprayed surface and thereby producing a flame retardant jute material having a total dry add-on of at least 25 percent by weight.

* * * * *